Patented Sept. 1, 1931

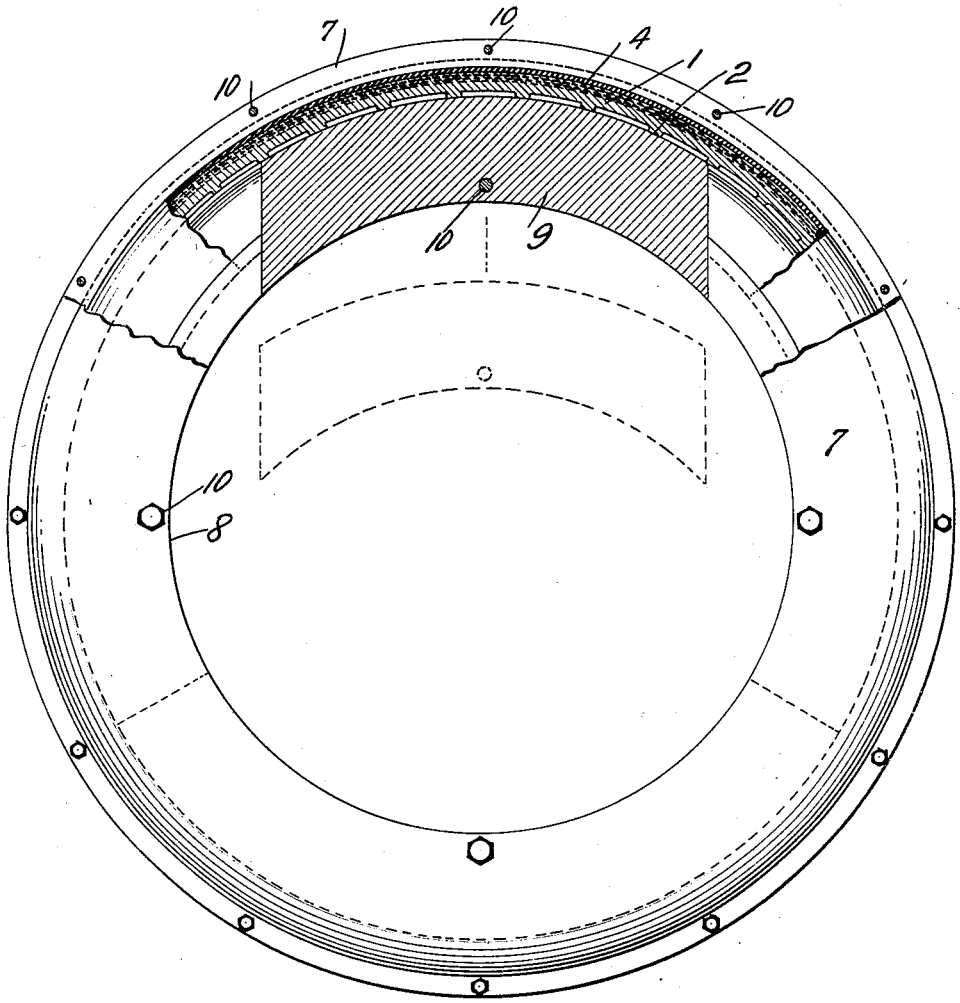

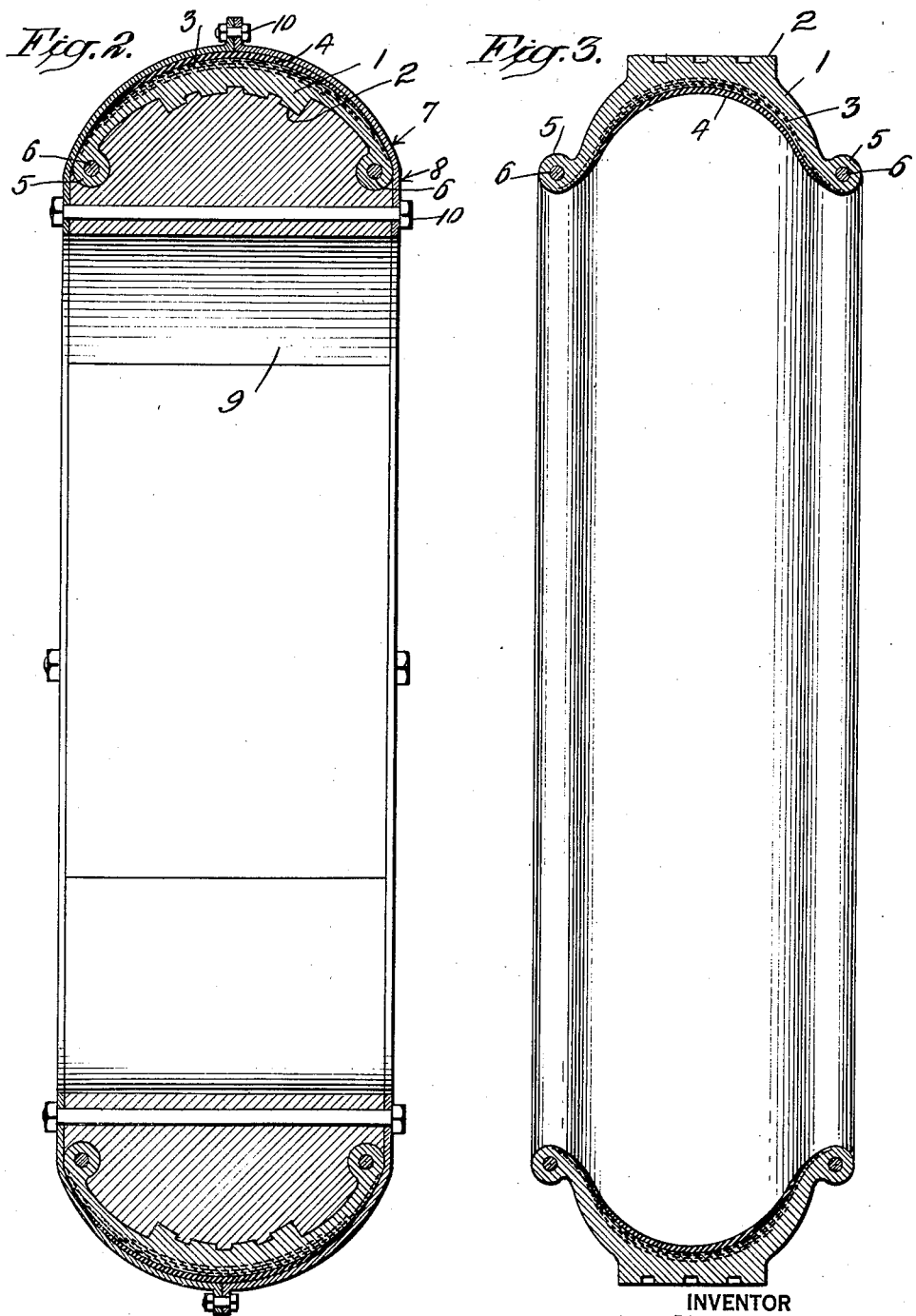

1,821,679

UNITED STATES PATENT OFFICE

IRA TRAUTMAN, OF FREEPORT, NEW YORK, ASSIGNOR TO AIR SEALED TIRE CORPORATION, OF NEW YORK, N. Y., A CORPORATION OF NEW YORK

METHOD FOR MOLDING TIRES

Application filed October 25, 1927. Serial No. 228,555.

The object of my invention is to provide a mould and method by virtue of which a tire of a peculiar kind is moulded in the reverse of the ordinary, that is the tread is moulded inwardly and the inside of the tire is moulded outwardly so that when the tire is completed the tread will be under a slight tension and the interior under compression, whereby the tire is made self-healing in the event that a nail or similar object punctures the same as the soft interior under compression will fit against such a nail or other puncturing matter with an air tight joint so that this tire will stand up even when punctured.

This and other objects are accomplished by my invention, one embodiment of which is hereinafter more particularly set forth.

For a more detailed description of my invention, reference is to be had to the accompanying drawings, forming a part hereof, in which Figure 1 is a plan view with parts removed and partially in section showing my improved mould with a tire therein.

Figure 2 is a cross section of the same, taken at any desirable diameter, and

Figure 3 is a cross section of the tire when complete and reversed.

Throughout the various views of the drawings, similar reference characters designate similar parts.

My improved tire 1 has a tread 2, the usual cord or cloth reinforce 3, interior surface 4 of soft rubber and heels 5 provided with the conventional cables 6, all of which are shown mounted in a wheel in my co-pending application, Serial No. 226,088 filed October 14, 1927. In this application will be found a suitable wheel for this tire with parts co-acting with the heels so as to form an air tight joint so that the tire may be inflated and kept inflated without a tube.

The method and means of making this tire will now be set forth. This tire is vulcanized in reverse, as shown in Figure 2, in a suitable mould 7 which is composed of a suitable exterior wall 8 and a core 9 on which the tire 1 is placed. Both the core and exterior walls 8 are sub-divided into as many parts as desired, and held in position during the process of vulcanization by suitable bolts 10 which function in the conventional manner.

When my improved tire is made, the core 9 is mounted on any suitable support, of the conventional kind, with its elements held firmly in proper relation and thereafter the rubber of the tire 1 and its attendant parts such as the cables 6 and canvas or cords 3 and inner surface 4 are laid on in exactly the conventional manner, except that they are put in reverse, as indicated in Figure 2 and as above stated, and thereafter the covers 8 of the mould 7 are put in place and held by the bolts 10 and while in this condition the tire is vulcanized in reverse. After this tire has been properly cured, the mould, core and tire are taken from the vulcanizing furnace and the mould and core are removed in the conventional manner, and thereafter the tire is reversed to its normal condition, as indicated in Figure 3. The reversal of the tire after vulcanization to bring the vulcanized rubber tread portion on the outside and the soft rubber section on the inside of the finished tire causes a substantial transverse compression in the inner soft rubber section, which advantageously increases the sealing properties of the latter.

While I have shown and described one embodiment of my invention, it is obvious that it is not restricted thereto, but that it is broad enough to cover all structures that come within the scope of the annexed claim.

Having thus described my invention, what I claim is:

The method of making a puncture proof tubeless pneumatic tire which comprises placing a layer of unvulcanized rubber for the outer surface and tread of the tire on a convex peripheral core surface, superposing a layer of tire reinforcing material thereon, covering said reinforcing material with a layer of soft rubber intended to form the inner surface of the tire, enclosing the exposed tire material by a vulcanization mould, then vulcanizing the tire, removing the mould from the tire, and reversing the cross-sectional curvature of the tire so formed as to place the inner soft rubber portion of the tire under transverse compression.

In testimony whereof, I have hereunto set my hand this 17th day of October, 1927.

IRA TRAUTMAN.